UNITED STATES PATENT OFFICE.

CARLETON ELLIS, OF LARCHMONT, NEW YORK, ASSIGNOR TO ELLIS-FOSTER COMPANY, A CORPORATION OF NEW JERSEY.

ANTIFOULING COMPOSITION.

944,420.   Specification of Letters Patent.   Patented Dec. 28, 1909.

No Drawing.   Application filed December 26, 1908.   Serial No. 469,298.

*To all whom it may concern:*

Be it known that I, CARLETON ELLIS, a citizen of the United States, residing at Larchmont, in the county of Westchester and State of New York, have invented certain new and useful Improvements in Antifouling Composition, of which the following is a specification.

This invention relates to paints intended for ships' bottoms and relates particularly to antifouling compositions having both bactericidal and fungicidal properties.

In the manufacture of antifouling paints, it has been the practice to employ copper in various forms and while the latter is a powerful fungicide, it is not so active as a bactericide.

The present invention involves the use of a powerful bactericidal body, namely, the condensation products of formaldehyde with various phenols, or with bodies such as the anilins, as, for instance, with carbolic and cresylic acid and the like phenolic bodies. By the joint use of copper compounds and these formaldehyde condensation products, an antifouling paint is secured which has remarkably efficient properties, serving to keep the hulls of ships free from all vegetable and animal growths for a long period of time even in the warm waters of tropical regions.

It is further the object of this invention to provide a composition which has dehiscent properties so that by forming a sort of stratified or lamellar coating, a peeling effect is secured which supplements the inhibitive action of the copper and formaldehyde bodies.

In the preferred form of my invention, I employ also an oil or other suitable vehicle carrying copper actually in solution so as to obtain the peculiar fungicidal effect which copper in such a condition has been found to produce, together with more or less of a dissolved copper compound.

A composition illustrative of my invention is made as follows: Ordinary formalin solution, containing approximately 40% of formaldehyde, is mixed with about an equal volume of commercial cresylic acid and a small quantity of hydrochloric acid; adding of the latter ordinarily enough to make about 10% of concentrated commercial acid. The mixture is then stirred until a gummy mass is produced. This gummy material is allowed to stand for 24 hours to harden and is then pulverized and washed first with dilute carbonate of soda solution, and then with water until the free acid is removed. The product is dried and finally ground. 2 lbs. of this condensed product, 2 lbs. of carbonate of copper, 3 lbs. of calcium sulfate or gypsum, ¼ lb. of sublimed sulfur and 1 lb. of barytes are then ground with a vehicle consisting of lime hardened rosin, 4 lbs., Chinese wood oil 2 lbs., copper oleate ½ lb., solvent naphtha 4 lbs. and benzin 2 lbs. to make a paste or composition of the desired consistency.

In making the vehicle, preferably I melt the rosin and add about 4% of lime, heating to 300 or 400° to secure a complete incorporation or combination of the lime and rosin. The wood oil is then added, followed by the copper oleate and the thinning solvents.

The consistency may be varied by modifying the proportion of the vehicle and solvent material and the composition may be given any desired color by the addition of suitable pigments. As green is the color customarily desired, I ordinarily enter a suitable quantity of Brunswick green or other green pigment.

The wood oil may be omitted if a very rapidly drying composition is required; as in some instances, it is necessary to remove the vessel from the water, paint it and launch it within 24 hours. Under such circumstances, I prefer to reduce or omit entirely the siccative oil. Various other oils may be used in this composition in lieu of wood oil although the latter has a peculiar inhibitive action on marine vegetable growths. Such oils as linseed, cotton seed, corn, rosin or other semi-drying oils, or even a small proportion of non-drying oil such as petroleum oil may be introduced. The usual drying agents such as manganese resinate, litharge, etc. may be incorporated to the extent desired. Various other forms of oil-soluble copper compounds may be used in lieu of the oleate, as for example, copper palmitate and the like. While the carbonate is a satisfactory form in which to introduce the solid copper compound, I may also make use of various other copper compounds such as copper oxid and the like and also introduce other inhibitive bodies including the arsenic compounds, oxid of mercury, zinc salts, etc.

In lieu of rosin, other resinous bodies may be used in whole or in part as for instance, Manila copal, kauri and similar hard resins. Other gums of a softer character may also be employed to a greater or like degree such as galipot and Burgundy pitch. For dark colored compositions, asphalt, gilsonite and various asphaltic oils and malthas may be introduced; likewise coal tars and pitches.

The most effective thinning material, I find to be solvent naphtha but I may make use of ordinary benzol or toluol as well as turpentine, wood turpentine, pine oil and the like. To reduce the inflammability, a quantity of carbon tetrachlorid may be added.

A very satisfactory thinning fluid is made by mixing ordinary solvent naphtha with about an equal volume of heavy naphtha from petroleum, flashing at a temperature of from 95 to 110° F. or even higher.

Ordinarily anilin oil condenses with formaldehyde to form a solid body of considerable utility which may be used in lieu of the described condensation products with the phenols. About equal volumes of the oil and formalin should be used. Para and meta formaldehyde also may be employed without condensation with phenols or amins. By the term condensation products as hereinafter used I embrace the solid bodies formed by the condensation of formaldehyde with itself or other organic compounds.

Having described my invention and indicated a typical composition to the details of which description I do not wish to be limited, what I claim is:—

1. An antifouling paint composition comprising the condensation products of formaldehyde with phenol materials incorporated in a suitable vehicle carrying a binding material and a dissolved copper compound.

2. An antifouling paint composition comprising the condensation products of formaldehyde with organic material incorporated in a vehicle carrying a resinous binder and a dissolved copper compound.

3. An antifouling paint composition comprising the condensation products of formaldehyde with phenolic material incorporated with a dissolved copper compound, a resinous binding material and a volatile vehicle.

4. An antifouling paint composition comprising condensation products of formaldehyde, a dissolved copper compound, a resinous binding material and a volatile vehicle including solvent naphtha.

5. An antifouling paint composition comprising a formaldehyde condensation product, copper carbonate, copper oleate, and a binding material.

6. An antifouling paint composition comprising a formaldehyde condensation product, copper carbonate, an oil soluble copper compound, a resinous material and a volatile vehicle.

7. An antifouling paint composition comprising a formaldehyde condensation product, an oil insoluble compound of copper, an oil soluble compound of copper, a resinous binder, and a volatile vehicle.

8. An antifouling paint composition comprising the formaldehyde condensation product with cresylic acid, copper carbonate, filling material, copper oleate, a hardened rosin, solvent naphtha, and benzin.

In testimony whereof I have affixed my signature in presence of two witnesses.

CARLETON ELLIS.

Witnesses:
 NATHANIEL L. FOSTER,
 FRANCES I. NEWMAN.